(12) United States Patent
Steidle et al.

(10) Patent No.: US 7,261,124 B2
(45) Date of Patent: Aug. 28, 2007

(54) BIPOLAR PLATE CHANNEL STRUCTURE WITH KNOBS FOR THE IMPROVEMENT OF WATER MANAGEMENT IN PARTICULAR ON THE CATHODE SIDE OF A FUEL CELL

(75) Inventors: Boris Steidle, Mainz-Kastel (DE); Dirk Rensink, Mainz (DE)

(73) Assignee: General Motors Corporation, Detroit, MI (US)

( * ) Notice: Subject to any disclaimer, the term of this patent is extended or adjusted under 35 U.S.C. 154(b) by 392 days.

(21) Appl. No.: 10/938,494

(22) Filed: Sep. 10, 2004

(65) Prior Publication Data

US 2006/0054221 A1  Mar. 16, 2006

(51) Int. Cl.
*H01M 8/02* (2006.01)
*H01M 2/14* (2006.01)
(52) U.S. Cl. .................. 137/561 A; 429/38; 429/34
(58) Field of Classification Search .......... 137/561 A; 429/34, 38, 39
See application file for complete search history.

(56) References Cited

U.S. PATENT DOCUMENTS

| 6,245,453 | B1 * | 6/2001 | Iwase et al. | 429/34 |
| 2001/0028973 | A1 * | 10/2001 | Ong et al. | 429/34 |
| 2004/0053094 | A1 * | 3/2004 | Bunker | 429/26 |
| 2004/0115514 | A1 * | 6/2004 | Iwase et al. | 429/26 |

FOREIGN PATENT DOCUMENTS

| DE | 198 35 759 | 2/2000 |
| DE | 101 13 001 | 10/2002 |
| WO | WO 02/069426 | * 9/2002 ................... 429/34 |

\* cited by examiner

*Primary Examiner*—John Rivell
(74) *Attorney, Agent, or Firm*—Harness, Dickey & Pierce, P.L.C.

(57) ABSTRACT

A fluid distribution assembly for use in a fuel cell includes a separator plate having a major face. A boundary element is disposed over the major face. A flow field communicates reactant in a flow direction across the separator plate. The flow field is defined by a plurality of knobs formed on the separator plate extending from the major face toward the boundary element.

29 Claims, 4 Drawing Sheets

BIPOLAR PLATE CHANNEL STRUCTURE WITH KNOBS FOR THE IMPROVEMENT OF WATER MANAGEMENT IN PARTICULAR ON THE CATHODE SIDE OF A FUEL CELL

FIELD OF THE INVENTION

The present invention relates to a fuel cell. More particularly, the present invention relates to a flow field on a bipolar plate for a fuel cell.

BACKGROUND OF THE INVENTION

Fuel cells have been proposed as a power source for electric vehicles and other applications. One such fuel cell is a PEM (i.e. Proton Exchange Membrane) fuel cell that includes a so-called "membrane-electrode-assembly" (MEA) having a thin, solid polymer membrane-electrolyte. The MEA is sandwiched between a pair of electrically conductive fluid distribution elements (i.e., bipolar plates) which serve as current collectors for the electrodes, and contain a so-called "flow field" which is an array of lands and grooves formed in the surface of the plate opposing the MEA.

The lands conduct current from the electrodes, while the grooves between the lands serve to distribute the fuel cell's gaseous reactants evenly over the faces of the electrodes. Gas diffusion media are positioned between each of the electrically conductive fluid distribution elements and the electrode faces of the MEA, to support the MEA where it confronts grooves in the flow field, and to conduct current therefrom to the adjacent lands.

A drawback of fuel cells, however, is the phenomenon of water being impeded from flowing outward from the MEA, often referred to as "flooding". Flooding can hinder a fuel cell's operation at low current density when the air flow through the cathode flow field is not sufficient to drive the water removal process. Excess liquid water also tends to plug the pores in gas diffusion media, and thereby isolate the catalytic sites from the reactant oxygen flow.

Typically, conventional flow fields employ discrete channels that induce strong non-uniform flow under the lands. The non-uniform flow under the lands tends to lead to a non-equilibrated water management. In some regions high flows may lead to a dry out of the MEA. Moreover, in some regions negligible flows tend to promote a conglomeration of liquid water which may lead to flooding and ultimately a reduction of the efficiency of the fuel cell stack as a whole. Therefore, there is a need for an improved fuel cell design to minimize the aforesaid drawbacks.

SUMMARY OF THE INVENTION

A fluid distribution assembly for use in a fuel cell includes a separator plate having a major face. A boundary element is disposed over the major face. A flow field communicates reactant in a flow direction across the separator plate. The flow field is defined by a plurality of knobs formed on the separator plate extending from the major face toward the boundary element.

According to other features, the plurality of knobs includes a first series of knobs arranged in a repeating manner across the separator plate in a direction generally transverse to the flow direction. A second series of knobs are arranged in a repeating manner across the separator plate in a direction generally transverse to the flow direction. A first series of gaps is defined between adjacent knobs of the first series of knobs and a second series of gaps is defined between adjacent knobs of the second series of knobs. A knob of the first series of knobs and a knob of the second series of knobs define a first footprint and a second footprint, respectively, for impeding flow of the reactant in the flow direction. The first footprint is offset from the second footprint in a direction transverse to the flow direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
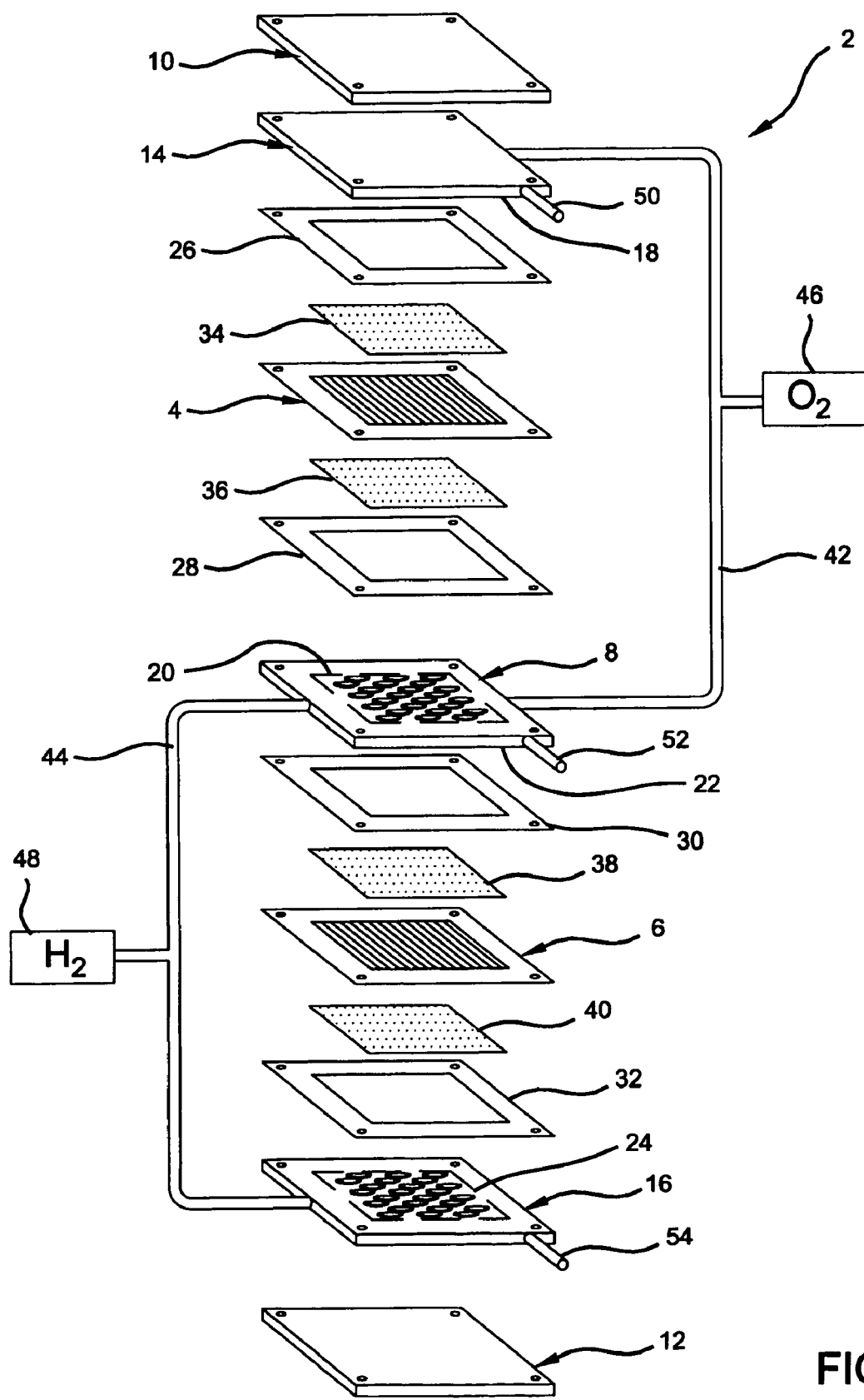
FIG. 1 is a schematic, exploded illustration of a PEM fuel cell stack (only two cells shown) according to the present invention.

FIG. 1 depicts a two cell, bipolar fuel cell stack 2 having a pair of membrane-electrode-assemblies (MEAs) 4 and 6 separated from each other by an electrically conductive fluid distribution element 8, hereinafter bipolar plate 8. The MEAs 4 and 6 and bipolar plate 8, are stacked together between clamping plates, or end plates 10 and 12, and end contact elements 14 and 16. The end contact elements 14 and 16, as well as both working faces of the bipolar plate 8, contain a plurality of grooves or channels 18, 20, 22 and 24, respectively, for distributing fuel and oxidant gases (i.e. $H_2$ and $O_2$) to the MEAs 4 and 6.

Nonconductive gaskets 26, 28, 30 and 32 provide seals and electrical insulation between the several components of the fuel cell stack. Gas permeable conductive materials or diffusion media 34, 36, 38 and 40 press up against the electrode faces of the MEAs 4 and 6. The diffusion media 34-40 may be referred to herein as boundary elements. The end contact elements 14 and 16 press up against the diffusion media 34 and 40 respectively, while the bipolar plate 8 presses up against the diffusion media 36 on the anode face of the MEA 4, and against the diffusion media 38 on the cathode face of the MEA 6.

Oxygen is supplied to the cathode side of the fuel cell stack from a storage tank 46 via appropriate supply plumbing 42, while hydrogen is supplied to the anode side of the fuel cell from a storage tank 48, via appropriate supply plumbing 44. Alternatively, ambient air may be supplied to the cathode side as an oxygen source and hydrogen to the anode side from a methanol or gasoline reformer, or the like. Exhaust plumbing (not shown) for both the $H_2$ and $O_2$ sides of the MEAs 4 and 6 will also be provided. Additional plumbing 50, 52 and 54 is provided for supplying liquid coolant to the bipolar plate 8 and the end plates 14 and 16. Appropriate plumbing for exhausting coolant from the bipolar plate 8 and the end plates 14 and 16 is also provided, but not shown.

Figure 2:
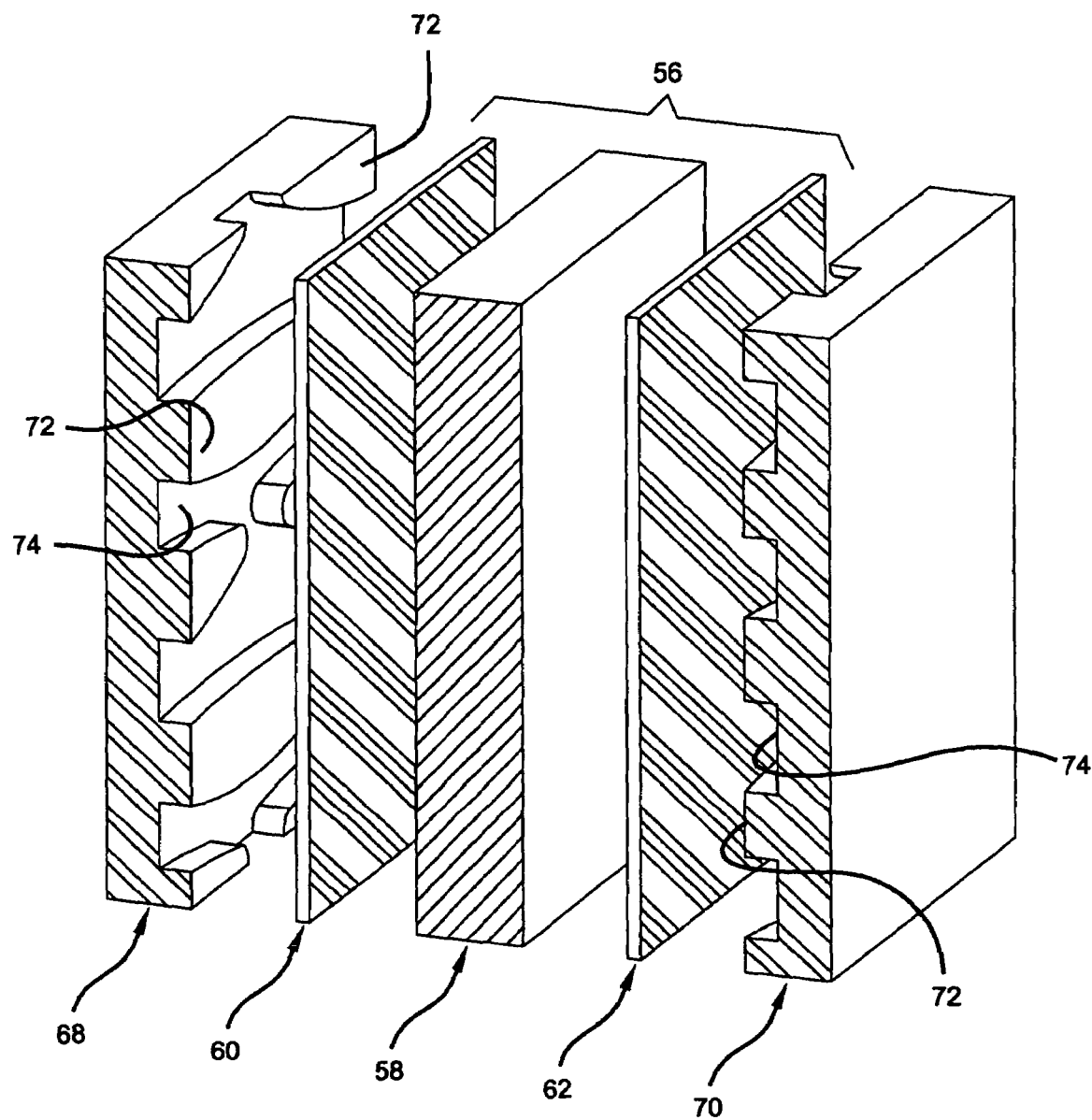
FIG. 2 is an enlarged exploded partial view of a fuel cell according to the present teachings.

FIG. 2 is an enlarged, exploded partial view of various components of a fuel cell according to the teachings of the present invention. As can be seen in FIG. 2, the fuel cell comprises a membrane electrode assembly (MEA) 56 that includes an ionically conductive membrane 58 sandwiched by an anode electrode 60 and a cathode electrode 62. The MEA 56 is further sandwiched by an anodic surface bipolar plate 68 and a cathodic surface bipolar plate 70. It is appreciated that gas diffusion media are preferably disposed between the bipolar plates 68 and 70 and the MEA 56, but are not necessary to the present invention and, therefore, have been omitted from this Figure for simplicity.

When a fuel stream of pure $H_2$ or hydrogen reformate is dispersed over the anode 60, electrons that are produced by the hydrogen oxidation reaction are conducted a short distance to the adjacently disposed electrically conductive fluid distribution element, or bipolar plate 68. Since the lands 72 of the bipolar plate 68 directly contact the anode electrode 60 (or diffusion media if used), electrical conductivity is facilitated and enhanced. Protons ($H^+$) produced from the anodic reaction, combined with water from the humid fuel stream pass through the anode 60 to the ionically conductive membrane 58 and through to the cathode 62. At the cathode side of the MEA 56, a stream of $O_2$ or ambient air that contains oxygen is dispersed over the cathode 62. The oxygen undergoes a reduction and the electrons that are produced are also conducted a short distance to another adjacently disposed bipolar plate 70. The reduced oxygen then reacts with the protons from the anode 60 and liquid water is produced.

Figure 3:
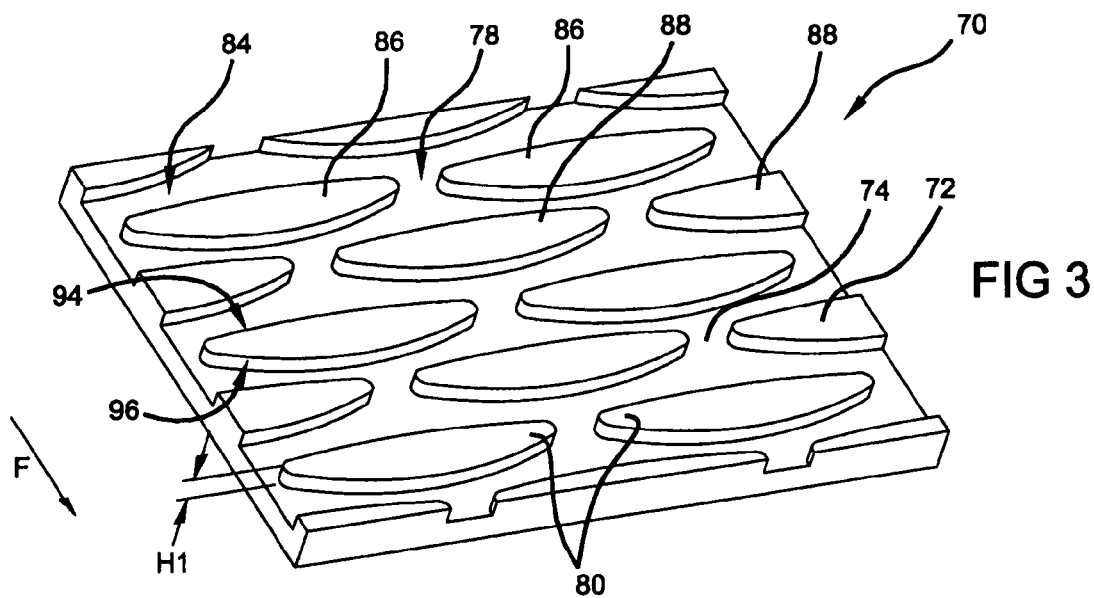
FIG. 3 is a detail perspective view of a flow field constructed in accordance to the present teachings.

With continued reference to FIG. 2 and further reference to FIGS. 3 and 4, the bipolar plate 70 will be described in greater detail. In accordance to the present teachings and in order to further facilitate the electrochemical reaction and improve the convective removal or water from the fuel cell, the bipolar plate 70 includes a major face 78 defining a plurality of knobs 80 extending therefrom. As used herein, the term "knobs" defines individual extension portions each having an outer boundary defining a perimeter. The plurality of knobs 80 cooperate to define a flow field 84 for directing reactant across the major face 78 of the bipolar plate 70 in a flow direction (F). As will be described herein, the flow field 84 employing knobs 80 leads to a more homogenous flow over the cathode 62 (or diffusion media) in the channels 74 and under the lands 72. In this regard, water management is improved, especially the extraction of liquid water. While the flow direction (F) is generally depicted in the drawings as a straight line, it is appreciated that the reactant flows between respective knobs 80 in a generally serpentine manner from an upstream side to a downstream side of the bipolar plate. In addition, a significant and quite homogeneous flow passes under the knobs 80 and enters the diffusion media, improving water management.

The plurality of knobs 80 generally include a first series of knobs 86 and a second series of knobs 88 arranged in a repeating manner along the bipolar plate 70 in a direction generally transverse to the flow direction (F). The first and second series of knobs 86 and 88, respectively, repeat in an alternating manner across the bipolar plate 70. A first series of gaps 90 (FIG. 4) are defined between adjacent knobs of the first series of knobs 86. Likewise a second series of gaps 92 is defined between adjacent knobs of said second series of knobs 88.

Figure 4:
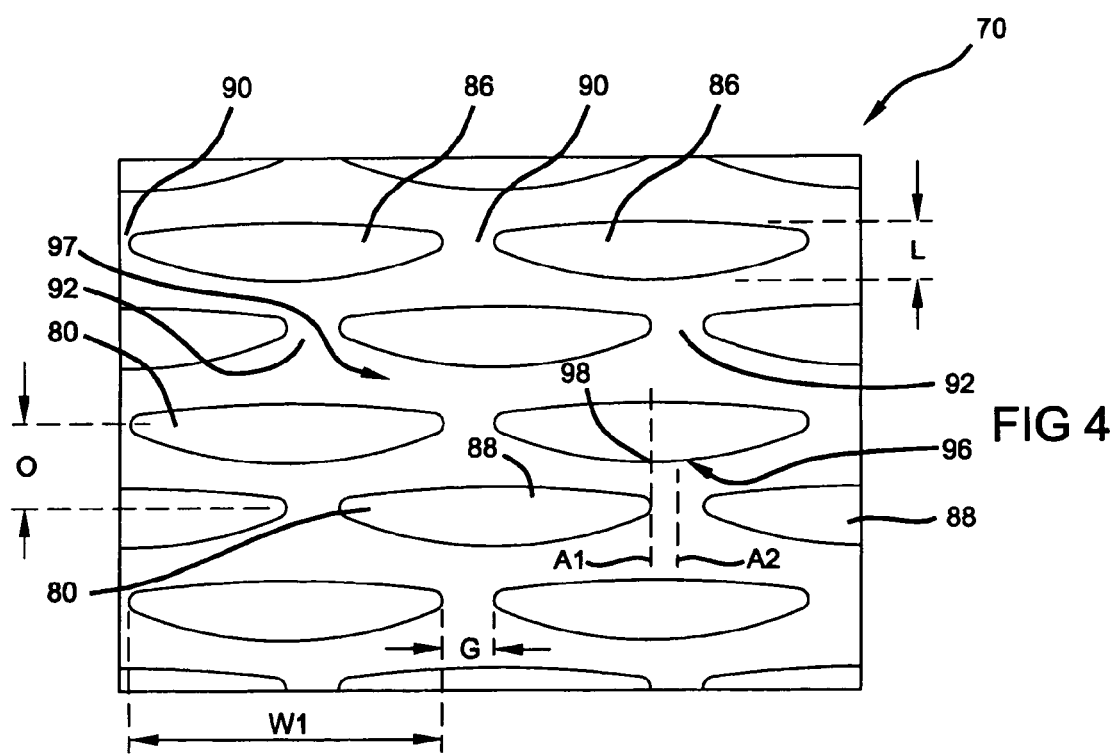
FIG. 4 is a plan view of the flow field illustrated in FIG. 3.

As best illustrated in FIG. 4, the first series of knobs 86 are staggered relative to the second series of knobs 88 in a direction perpendicular to the flow direction (F). The plurality of knobs 80 each define an upstream surface 94 and a downstream surface 96, respectively (FIG. 3). The upstream and the downstream surfaces 94 and 96, respectfully, define a convex contour. The staggered relationship between the first and second series of knobs 86, 88, along with the convex contour of each knob 80 reduces dead water areas in the flow field 84 and promotes extraction of liquid water. More specifically, the varying cross-sections of the spaces between adjacent knobs (referred generally as a passage area 97, FIG. 4) discourage slugs of liquid water from becoming stuck between adjacent knobs. In the smallest cross-sections, higher flow velocities lead to a transport of possible slugs in the downstream direction.

With specific reference now to FIGS. 3 and 4, dimensional aspects of the knobs 80 will be explained. It is appreciated however, that the dimensions associated with the knobs 80, the bipolar plate 70 and the flow field 84 as a whole are merely exemplary, and other dimensions may be similarly employed. Each knob 80 extends from the major face 78 a distance (H1, FIG. 3) defining a channel height. Preferably the channel height is approximately 0.3 mm. Each knob 80 defines a footprint having a width (W1) extending transverse to the flow direction (F) and a length (L) extending lateral to the flow direction (F). Preferably the width (W1) and the length (L) are approximately 5 mm and 1 mm, respectively, providing a W1:L ratio of 5:1. A distance between respective centerlines of the first series of knobs 86 and the second series of knobs 88 defines an offset (O). Preferably the offset (O) is approximately 1.25 mm. The series of gaps 90, 92 define a distance (G), preferably 0.5 mm. As a result, a given space between adjacent knobs (at the gaps 90, 92 and at the passage area 97) varies between 0.5 mm to 1 mm.

Of particular note, an axis (A1) defined along respective centerpoints of repeating first series of knobs 86 is aligned with an outer edge of repeating second series of knobs 88. Such a relationship presents an irregular pattern whereby a peak 98 of the convex downstream surface 96 is offset from an axis (A2) defined at a centerpoint of a proximate downstream gap 90, 92. Moreover, edges that may tend to hinder water movement, are noticeably absent. As a result, transportation of water is facilitated around the arcuate surfaces of respective knobs 80 and ultimately across the flow field 84 of the bipolar plate 70 in the flow direction (F).

Figure 5:
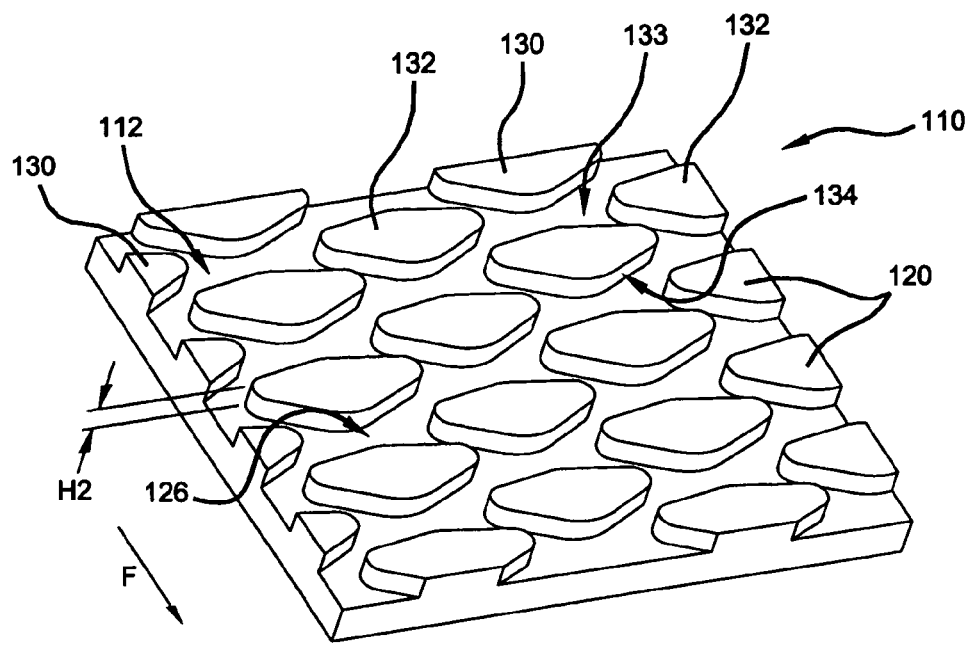
FIG. 5 is a detail perspective view of a flow field according to additional features of the present teachings.
Figure 6:
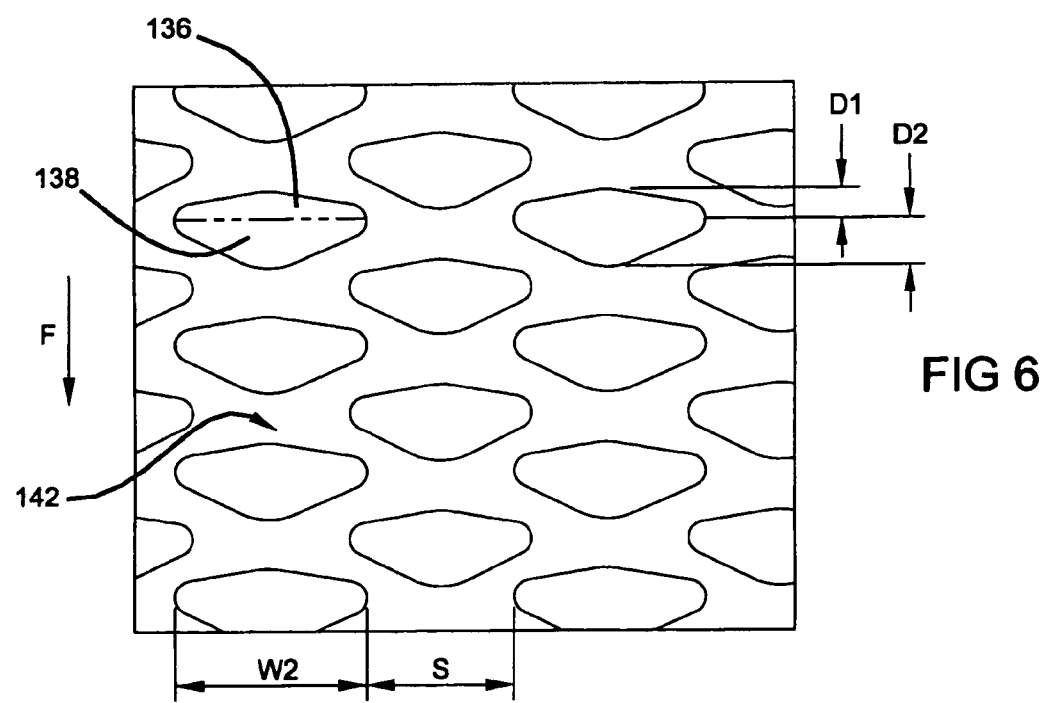
FIG. 6 is a plan view of the flow field illustrated in FIG. 5.

With reference now to FIGS. 5 and 6, a bipolar plate 110 according to other features will be described. The bipolar plate 110 includes a major face 112 defining a plurality of knobs 120 extending therefrom. The knobs 120 each generally define a distorted diamond shape. The plurality of knobs 120 cooperate to define a flow field 126 for directing reactant across the major face 112 of the bipolar plate 110 in a flow direction (F).

The plurality of knobs 120 generally include a first series of knobs 130 and a second series of knobs 132 arranged in a repeating manner along the bipolar plate 110 in a direction generally transverse to the flow direction (F). The plurality of knobs 120 each define an upstream surface 133 and a downstream surface 134, respectively. The first and second series of knobs 130 and 132, respectively, repeat in an alternating manner across the bipolar plate 110.

With specific reference now to FIG. 6, dimensional aspects of the knobs 120 will be described. Again, the dimensions associated with the bipolar plate 110 are merely exemplary. A channel height H2 is preferably 0.3 mm. Each knob 120 generally defines an upstream triangle 136 and a downstream triangle 138. The upstream triangle and the downstream triangle 136 and 138 define a height D1 and D2 respectively. Preferably the upstream triangle height D1 is 0.25 mm and the downstream triangle height D2 is 0.75 mm, providing an appropriate 1:3, D1:D2 ratio. A span (S) between adjacent knobs 120 is preferably 2 mm and the width (W2) of a knob 120 is preferably 3 mm, providing an approximate S:W2 ratio of 2:3.

The knobs 120 present varying cross-sections (referred generally as a passage area 142) between adjacent upstream surfaces and downstream surfaces 133 and 134 respectively. The passage area discourages slugs of liquid water from becoming stuck between adjacent knobs by promoting higher flow velocities at the smallest cross-sections.

Those skilled in the art can now appreciate from the foregoing description that the broad teachings of the present invention can be implemented in a variety of forms. For example which the knobs 80 and 120 illustrated herein are shown as having a distorted elliptical and diamond shape respectively, other shapes may be employed such as pure ellipses having a width to height ratio of 5:1. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fluid distribution assembly for use in a fuel cell comprising:
   a separator plate having a major face;
   a boundary element disposed over said major face; and
   a flow field for communicating reactant in a flow direction across said separator plate, said flow field defined by a plurality of knobs formed on said separator plate extending from said major face toward said boundary element, wherein each knob of said plurality of knobs defines an upstream surface and a downstream surface respectively, said upstream and said downstream surfaces defining a convex contour.

2. The fluid distribution assembly of claim 1 wherein said plurality of knobs comprises:
   a first series of knobs arranged in a repeating manner across said separator plate in a direction generally transverse to said flow direction; and
   a second series of knobs arranged in a repeating manner across said separator plate in a direction generally transverse to said flow direction.

3. The fluid distribution assembly of claim 2 wherein a knob of said first series of knobs and a knob of said second series of knobs define a first footprint and a second footprint, respectively, for impeding flow of said reactant in said flow direction, wherein said first footprint is offset from said second footprint in a direction transverse to said flow direction.

4. The fluid distribution assembly of claim 1 wherein a first series of gaps is defined between adjacent knobs of said first series of knobs and a second series of gaps is defined between adjacent knobs of said second series of knobs.

5. The fluid distribution assembly of claim 4 wherein a gap of said first series of gaps and a gap of said second series of gaps define a first passage and a second passage, respectively, for permitting flow of said reactant in said flow direction, wherein said first gap is offset from said second gap in a direction transverse to said flow direction.

6. The fluid distribution assembly of claim 1 wherein each knob of said plurality of knobs defines a diamond shaped footprint.

7. The fluid distribution assembly of claim 6 wherein said diamond shaped footprint is further defined by an upstream portion defining an upstream triangle and a downstream portion defining a downstream triangle, said upstream triangle extending at a first distance in an upstream direction and said downstream triangle extending in a second distance in a downstream direction, said second distance being greater than said first distance.

8. A fuel cell comprising:
   a separator plate having a major face and defining a flow field;
   a boundary element disposed over said major face; and
   a plurality of individual knobs defined on said major face of said separator plate and extending toward said boundary element;
   wherein each knob of said plurality of knobs defines an upstream surface and a downstream surface, wherein a space defined between adjacent upstream and downstream surfaces presents a passage of varying cross section for permitting reactant flow therethrough.

9. The fuel cell of claim 8 wherein said plurality of knobs comprises:
   a first series of knobs arranged in a repeating manner across said separator plate in a direction generally transverse to a flow direction; and
   a second series of knobs arranged in a repeating manner across said separator plate in a direction generally transverse to said flow direction, said second series of knobs being downstream in said flow direction relative to said first series of knobs.

10. The fuel cell of claim 9 wherein a knob of said first series of knobs and a knob of said second series of knobs define a first footprint and a second footprint, respectively, for impeding flow of a reactant in said flow direction, wherein said first footprint is offset from said second footprint in a direction transverse to said flow direction.

11. The fuel cell of claim 8 wherein said plurality of knobs define an upstream surface and a downstream surface respectively, said upstream surface and said downstream surface defining a convex contour.

12. The fuel cell of claim 8 wherein each knob of said series of knobs defines a diamond shaped footprint.

13. The fuel cell of claim 12 wherein said diamond shaped footprint is further defined by an upstream portion defining an upstream triangle and a downstream portion defining a downstream triangle, said upstream triangle extending at a first distance in an upstream direction and said downstream triangle extending in a second distance in a downstream direction, said second distance being greater than said first distance.

14. A separator plate for a fuel cell comprising:
   a major face;
   a first series of knobs arranged on said major face across the separator plate in a direction generally transverse to a flow direction; and
   a second series of knobs arranged on said major face across the separator plate in a direction generally transverse to said flow direction, said second series of knobs offset from said first series of knobs in a direction generally transverse to said flow direction;

wherein each knob of said first and second series of knobs defines an upstream surface and a downstream surface, wherein a space defined between adjacent upstream and downstream surfaces presents a passage of varying cross section for permitting reactant flow therethrough.

15. The separator plate of claim 14 wherein said upstream surface and said downstream surface of each knob define a convex contour.

16. The separator plate of claim 14 wherein each knob of said series of knobs defines a diamond shaped footprint.

17. The separator plate of claim 16 wherein said diamond shaped footprint is further defined by an upstream portion defining an upstream triangle and a downstream portion defining a downstream triangle, said upstream triangle extending at a first distance in an upstream direction and said downstream triangle extending in a second distance in a downstream direction, said second distance being greater than said first distance.

18. The separator plate of claim 14 wherein said first and second series of knobs extend across an entirety of said major face.

19. A fluid distribution assembly for use in a fuel cell comprising:
a separator plate having a major face;
a boundary element disposed over said major face; and
a flow field for communicating reactant in a flow direction across said separator plate, said flow field defined by a plurality of knobs formed on said separator plate extending from said major face toward said boundary element, wherein each knob of said plurality of knobs defines a diamond shaped footprint defined by an upstream portion defining an upstream triangle and a downstream portion defining a downstream triangle, said upstream triangle extending at a first distance in an upstream direction and said downstream triangle extending in a second distance in a downstream direction, said second distance being greater than said first distance.

20. The fluid distribution assembly of claim 19 wherein said plurality of knobs comprises:
a first series of knobs arranged in a repeating manner across said separator plate in a direction generally transverse to said flow direction; and
a second series of knobs arranged in a repeating manner across said separator plate in a direction generally transverse to said flow direction.

21. The fluid distribution assembly of claim 20 wherein a knob of said first series of knobs and a knob of said second series of knobs define a first footprint and a second footprint, respectively, for impeding flow of said reactant in said flow direction, wherein said first footprint is offset from said second footprint in a direction transverse to said flow direction.

22. A fluid distribution assembly for use in a fuel cell comprising:
a separator plate having a major face;
a boundary element disposed over said major face; and
a flow field for communicating reactant in a flow direction across said separator plate, said flow field defined by a first and second series of knobs arranged in a repeating manner across said separator plate in a direction generally transverse to a flow direction, said second series of knobs being downstream from said first series of knobs; and
wherein a midpoint defined between a gap of adjacent knobs of said first series of knobs is offset from a transverse line extending through a center of a knob of said second series of knobs.

23. The fluid distribution assembly of claim 22 wherein each knob of said first and second series of knobs defines an upstream surface and a downstream surface, wherein a space defined between adjacent upstream and downstream surfaces presents a passage of varying cross section for permitting reactant flow therethrough.

24. The fluid distribution assembly of claim 22 wherein said upstream surface and said downstream surface of each knob define a convex contour.

25. The fluid distribution assembly of claim 22 wherein each knob of said series of knobs defines a diamond shaped footprint.

26. A fluid distribution assembly for use in a fuel cell comprising:
a separator plate having a major face;
a boundary element disposed over said major face; and
a flow field for communicating reactant in a flow direction across said separator plate, said flow field defined by a plurality of knobs formed on said separator plate extending from said major face toward said boundary element, each of said plurality of knobs having an asymmetric profile about a center line extending transverse to the flow direction.

27. The fluid distribution assembly of claim 26 wherein an upstream surface and a downstream surface of each knob of said series of knobs defines a convex contour.

28. The fluid distribution assembly of claim 26 wherein each knob of said series of knobs defines a diamond shaped footprint.

29. The fluid distribution assembly of claim 28 wherein said diamond shaped footprint is further defined by an upstream portion defining an upstream triangle and a downstream portion defining a downstream triangle, said upstream triangle extending at a first distance in an upstream direction and said downstream triangle extending in a second distance in a downstream direction, said second distance being greater than said first distance.

* * * * *